United States Patent
Kim

(10) Patent No.: US 9,426,446 B2
(45) Date of Patent: Aug. 23, 2016

(54) SYSTEM AND METHOD FOR PROVIDING 3-DIMENSIONAL IMAGES

(71) Applicant: SAMSUNG ELECTRONICS CO., LTD., Suwon-si, Gyeonggi-do (KR)

(72) Inventor: Tae Hyun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 14/187,680

(22) Filed: Feb. 24, 2014

(65) Prior Publication Data

US 2014/0333733 A1    Nov. 13, 2014

(30) Foreign Application Priority Data

May 13, 2013 (KR) .................. 10-2013-0053657

(51) Int. Cl.
   *H04N 13/02*    (2006.01)

(52) U.S. Cl.
   CPC ....... *H04N 13/0221* (2013.01); *H04N 13/0296* (2013.01)

(58) Field of Classification Search
   CPC .......... H04N 13/0055; H04N 13/0221; H04N 13/0296; H04N 13/0431; H04N 13/0003
   USPC .......................................................... 348/50
   See application file for complete search history.

(56) References Cited

U.S. PATENT DOCUMENTS

| 2007/0008091 | A1* | 1/2007 | Takenaga | G08G 1/16 340/435 |
| 2009/0027549 | A1* | 1/2009 | Weisgerber | G03B 21/40 348/441 |
| 2012/0294549 | A1* | 11/2012 | Doepke | G06T 3/4038 382/294 |

* cited by examiner

*Primary Examiner* — William C Vaughn, Jr.
*Assistant Examiner* — Daniel Tekle
(74) *Attorney, Agent, or Firm* — Drinker Biddle & Reath LLP

(57) ABSTRACT

Disclosed herein are a system and method for providing 3-Dimensional (3D) images. The system includes: an image capturing apparatus that acquires an image of a subject; an accelerometer that measures acceleration; and a controller that synchronizes a series of images acquired by the image capturing apparatus with the respective locations of the images of the series. The location of each image is calculated based on acceleration with respect to the image. 3D image regions of the individual images are identified based on an image acquisition reference region. Locations of one or more 3D image regions are then adjusted. The 3D image regions (adjusted or otherwise) are then use to generate 3D images.

13 Claims, 6 Drawing Sheets

SYSTEM AND METHOD FOR PROVIDING 3-DIMENSIONAL IMAGES

CROSS-REFERENCE TO RELATED APPLICATIONS

This application claims the priority benefit of Korean Patent Application No. 10-2013-0053657, filed on May 13, 2013 in the Korean Intellectual Property Office, the disclosure of which is incorporated herein by reference.

BACKGROUND

1. Field

Embodiments of the disclosure relate to a system and method for providing 3-dimensional (3D) images.

2. Description of the Related Art

Various techniques for photographing 3-dimensional (3D) images through a digital camera, a camcorder, or the like have recently been proposed. In one example, a 3D image restoration technique that applies a specific image processing algorithm to 2-dimensional (2D) images to restore 3D images has been developed. In another example, a technique that uses a parallax camera (for example, a stereoscopic camera) with two lenses has been developed.

However, reconfiguring a 2D camera to function as a stereoscopic camera using two sensors or two lenses is difficult due to design, cost, and complexity. Accordingly, 2D cameras generally use an algorithm for creating a 3D image from a single 2D image.

More specifically, 2D cameras generally create 3D images based on depth according to a monocular effect. However, this method is effective for only for specific scenes, and the resultant 3D images, particularly soft tone images, do not display as much depth as those created by a stereoscopic camera.

SUMMARY

According to various embodiments, a system and method for providing 3-dimensional (3D) images is capable of acquiring natural 3D images by adjusting an interval between left and right images to a constant interval. Additional aspects will be set forth in part in the description that follows.

In accordance with one aspect, a 3-Dimensional (3D) image providing system includes: an image capturing apparatus that acquires image of a subject; an accelerometer that measures acceleration; and a controller that synchronizes images acquired by the image capturing apparatus with the locations of the images. The locations are calculated based on acceleration with respect to the respective images. The controller also designates one or more 3D image regions of the individual images based on an image acquisition reference region, adjusts the locations of the one or more 3D image regions, and crops the one or more 3D image regions to generate 3D images.

The controller may include: a relative coordinate calculator that calculates the location of each image at the time the image was acquired, based on acceleration as measured by the accelerometer. The controller may further include: a synchronization processor that matches each image with its calculated location; an image acquisition location setting unit that adjusts the locations of the one or more 3D image regions of the respective images based on a reference disparity and on the image acquisition reference region; an image cropping unit that crops the one or more 3D image regions of each image; and a 3D image generator that generates the 3D images based on the cropped 3D image regions.

The relative coordinate calculator may calculate the location of each image at the time when the image was acquired using Equation (1) below:

$$x(t_1) = \int_{t_0}^{t_1} \int_{t_0}^{t_0} \ddot{x}(t) dt - x(t_0),$$

where $x(t_1)$ represents the location of the image at the time when the image was acquired, $t_0$ represents a time at which the calculation has been started, $t_1$ represents a time at which photographing has started, and $\ddot{x}(t)$ represents an acceleration value.

The image acquisition location setting unit may set a disparity between first image and second image to the reference disparity, or set the reference disparity to an arbitrary value input by a user.

The image acquisition location setting unit may move a 3D image region of an image such that a disparity between the image and the previous image becomes the reference disparity.

The image acquisition location setting unit may set the image acquisition reference region from the first image transferred from the image capturing apparatus.

The image acquisition location setting unit may adjust the vertical alignment of each of the acquired images based on the image acquisition reference region.

The 3D image providing system may further include a 3D panorama image generator that generates a 3D panorama image based on the 3D image regions of those images acquired by the image capturing apparatus (e.g., through panning) and cropped by the image cropping unit.

The 3D image providing system may further include a mode setting unit that sets a 3D image generation mode or a 3D panorama image generation mode according to a selection from a user.

In accordance with another aspect, a 3D image providing method includes: when a 3D image generation mode is set, acquiring an image of a subject through an image capturing apparatus; measuring acceleration through an accelerometer; synchronizing images acquired by the image capturing apparatus with the locations of the images. The location of each image is calculated based on acceleration with respect to the images at the time the image was acquired. If the acquired image is a first image of a series of images, the method further includes setting an image acquisition reference region from the first image. If the acquired image is not a first image of a series of images, the method further includes identifying one or more 3D image regions of the individual images based on the image acquisition reference region; adjusting the locations of the one or more 3D image regions; cropping the one or more 3D image regions from each image; and generating 3D images based on the cropped 3D image regions.

Setting the one or more 3D image regions may include: if the acquired image is not a first image of a series of images, calculating a disparity between the image and the previous image; and moving a 3D image region such that the disparity between the image and the previous image becomes the reference disparity.

Before calculating the disparity between the image and the previous image, the disparity between the first image and a second image may be set to the reference disparity. Alternatively, the reference disparity may be set to an arbitrary value input by a user.

After a 3D image region of the one or more identified 3D regions of the acquired image is moved, the vertical alignment of each of the images may be adjusted based on the image acquisition reference region.

The location of each image at the time when the image is acquired may be calculated by Equation (1) below:

$$x(t_1) = \int_{t_0}^{t_1}\int_{t_0}^{t_0}\ddot{x}(t)dt - x(t_0),$$

where $x(t_1)$ represents the location of the image at a time when the image was acquired, $t_0$ represents the time at which the calculation started, $t_1$ represents the time at which photographing started, and $\ddot{x}(t)$ represents an acceleration value.

After the 3D images are generated, the 3D images may be connected to generate a 3D panorama image.

According to various embodiments, using the system and method for providing 3D images described above, it is possible to adjust the interval between left and right images to a constant interval by compensating for a user's panning speed upon panning in a left-right direction, thereby acquiring a 3D panorama image with an appropriate sense of depth.

BRIEF DESCRIPTION OF THE DRAWINGS

These and/or other aspects will become apparent and more readily appreciated from the following description of the embodiments taken in conjunction with the accompanying drawings of which.

DETAILED DESCRIPTION

Figure 1:
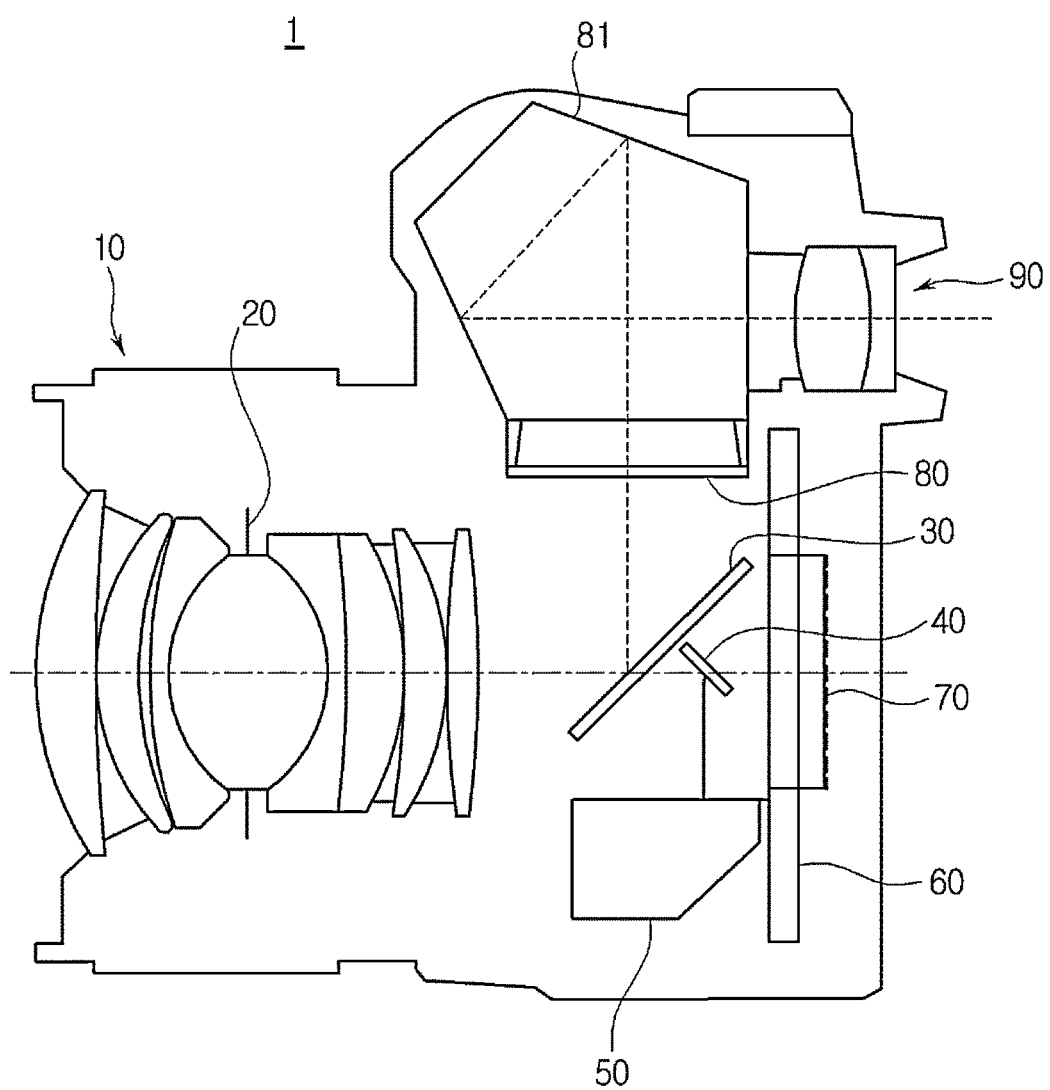
FIG. 1 is a cross-sectional view illustrating a structure of a camera apparatus according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Expressions such as "at least one of," when preceding a list of elements, modify the entire list of elements It will be understood that, although the terms, "first," "second," etc. may be used herein to describe various elements, these elements should not be limited by these terms. These terms are only used to distinguish one element from another.

FIG. 1 is a cross-sectional view illustrating a structure of a camera apparatus according to an embodiment.

Referring to FIG. 1, a camera apparatus 1 may include a lens unit 10, an iris 20, a main mirror 30, a sub mirror 40, an Auto Focusing (AF) module 50, a focal-plane shutter 60, an image capturing region 70, a focusing screen 80, a pentaprism 81, and an ocular lens 90.

The lens unit 10 collects light reflected from a subject, and forms an image on the image capturing region 70. The lens unit 10 may include a plurality of lenses. The plurality of lenses may form several optical groups according to their functions.

Also, the lens unit 10 may include an image stabilizer (not shown), and an AF driver (not shown). The image stabilizer prevents image quality from deteriorating due to a user's hand shake. The AF driver receives AF information from the AF module 50, and adjusts the focus of the lens unit 10 based on the AF information.

Meanwhile, the lens unit 10 may include the iris 20. The iris 20 may adjust the amount of light passing through the lens unit 10 and image density. More specifically, when increasing the diameter of the iris 20 so as to pass a greater amount of light through the iris 20, a user can acquire brighter images. However, since increasing the diameter of the iris 20 results in a larger aperture, image density is lowered. Meanwhile, when reducing the diameter of the iris 20 so as to pass a smaller amount of light through the iris 20, the user can acquire darker images. Also, since reducing the diameter of the iris 20 results in a smaller aperture, image density can be relatively enhanced compared to when increasing the diameter of the iris 20.

Since the iris 20 is disposed between lenses, an image of the iris 20 may be formed by the lenses. A virtual image of the iris 20, formed by lenses arranged in front of the iris 20 (that is, between the iris 20 and the subject), is called an entrance pupil, and a virtual image of the iris 20, formed by lenses arranged behind the iris 20 (that is, between the iris 20 and the image capturing region 70), is called an exit pupil. Particularly, the exit pupil greatly affects the brightness of an image, and accordingly, plays an important role in adjusting brightness and performing an AF function.

The main mirror 30 may transmit a part of light passed through the lens unit 10 and reflect the remaining part of the light. More specifically, the main mirror 30 reflects a part of light passed through the lens unit 10 toward the focusing screen 80 so that the user can see the light through the ocular lens 90. The remaining part of light transmitted through the main mirror 30 is used to detect a focal point.

The camera apparatus 1 (specifically, a Digital Single Lens Reflex (DSLR) camera) may perform Through The Lens (TTL) functions using the main mirror 30. The TTL functions are to perform TTL viewfinder, TTL distance measuring, TTL light metering, etc. using light passed through the lens unit 10.

In detail, the TTL viewfinder is to reflect light passed through the lens unit 10 so as for a user to be able to view an image to be taken through a viewfinder. The TTL light measuring is to measure the brightness of an image to be taken using light passed through the lens unit 10. That is, the TTL light measuring is used for an Auto Exposure (AE) adjustment function.

The TTL distance measuring is to adjust a focal point of a subject using light passed through the lens unit 10. That is, the TTL distance measuring is used for an AF function.

The sub mirror 40 reflects light passed through the main mirror 30 such that the light passed through the main mirror 30 is again reflected against the main mirror 30 and then incident to the AF module 50. To do this, the sub mirror 40 is arranged to make an acute angle (ranging from 0° to 90°) with the main mirror 30. As such, the sub mirror 40 is arranged behind the main mirror 30 so as to direct light passed through the main mirror 30 toward the main mirror 30, thereby constituting an optical device. The optical device also acts to provide light to the AF module 50.

The AF module 50 functions to focus on a subject under the control of a controller (not shown). When the AF module 50 fails to focus on a subject, the AF module 50 transfers a driving signal to a driver (not shown) of the lens unit 10 so as to focus on the subject by the control of the controller.

The focal-plane shutter 60 is installed just in front of the image capturing region 70 located close to a focal plane of the camera body. The focal-plane shutter 60 may be comprised of two black curtains or metal layers, coated with rubber and called first and second curtains. The focal-plane shutter 60 operates by opening the first curtain to expose the image capturing region 70 to light and then closing the second curtain to block light from the image capturing region 70 upon image-taking. Accordingly, the focal-plane shutter 60 can adjust the shutter speed using a time difference between the time when the first curtain is opened and the time when the second curtain is closed. Also, the focal-plane shutter 60 can be classified into a horizontal-run type and a vertical-run type according to a direction in which the first and second curtains run. Most cameras adopt the vertical-run type. Also, the camera apparatus 1 may include a lens shutter, a Thornton shutter, a light value shutter, or the like, in lieu of the focal-plane shutter 60.

The image capturing region 70 may optically sense an image of a subject. When the camera apparatus 1 is a film camera, film may be placed on the image capturing region 70. And, when the camera apparatus 1 is a digital camera, a plurality of image sensors may be arranged on the image capturing region 70. When the camera apparatus 1 is a DSLR camera, a plurality of image sensors for optically sensing light may be arranged on the image capturing region 70. Image sensors for a digital camera can be classified into Charge Coupled Devices (CCD) and Complementary Metal Oxide Semiconductors (CMOS) that operate around the basically same principle.

The focusing screen 80 may include a mat surface and a Fresnel lens. The mat surface may be placed so that it is optically equivalent to a focal surface upon image-taking. Accordingly, a duplicate of the image to be taken may appear on the mat surface. The Fresnel lens concentrates light passed through the mat surface to enable the user to view a brighter image through the ocular lens 90.

The pentaprism 81 is a pentagonal prism. The pentaprism 81 functions to convert an erect reversed image formed on the focusing screen 80 into an erect non-reversed image. Accordingly, the user can see an image to be taken through a viewfinder in the same form as the corresponding subject (as seen with the naked eye). An "erect reversed image" means an image that is in a correct position in an up-down direction but in a reversed position in a left-right direction. An "erect non-reversed image" means an image that is in a correct position in all directions.

The ocular lens 90 forms a virtual image 1 m ahead so that the user can see an image on the focusing screen 80. Accordingly, the user can see the image to be taken through the ocular lens 90.

Figure 2:
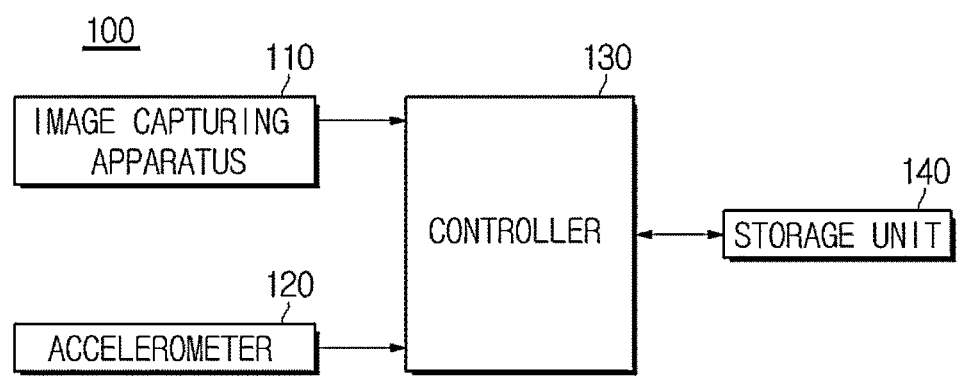
FIG. 2 is a block diagram of a 3D image providing system according to an embodiment.
Figure 3:
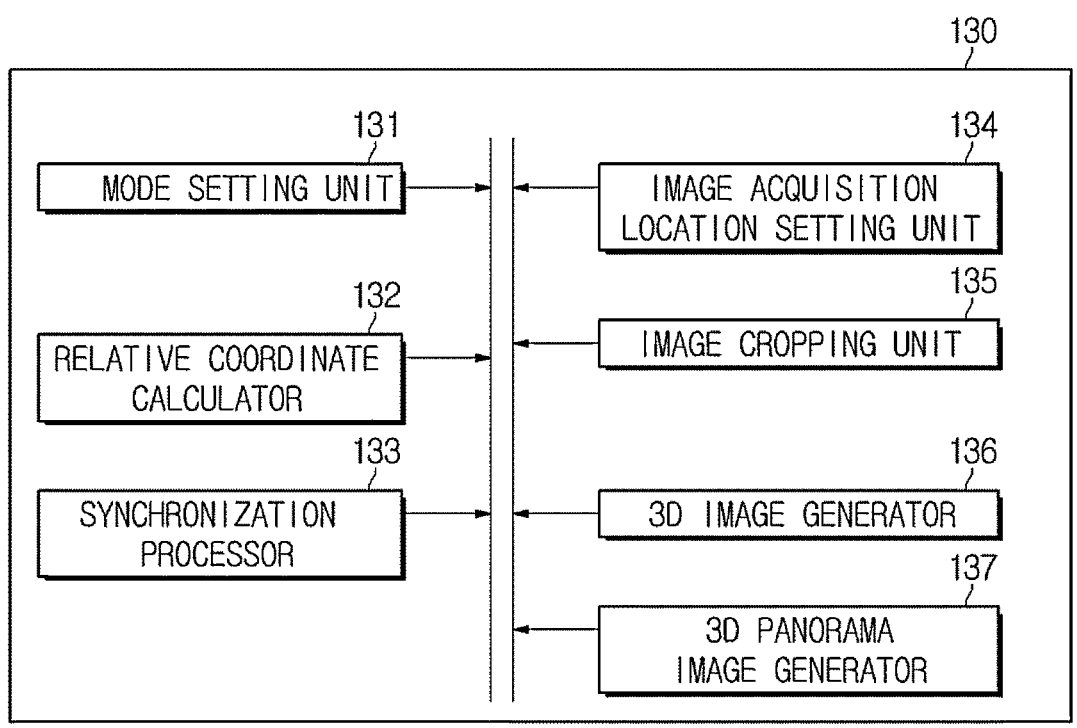
FIG. 3 is a block diagram of a controller of FIG. 2 according to an embodiment.
Figure 4:
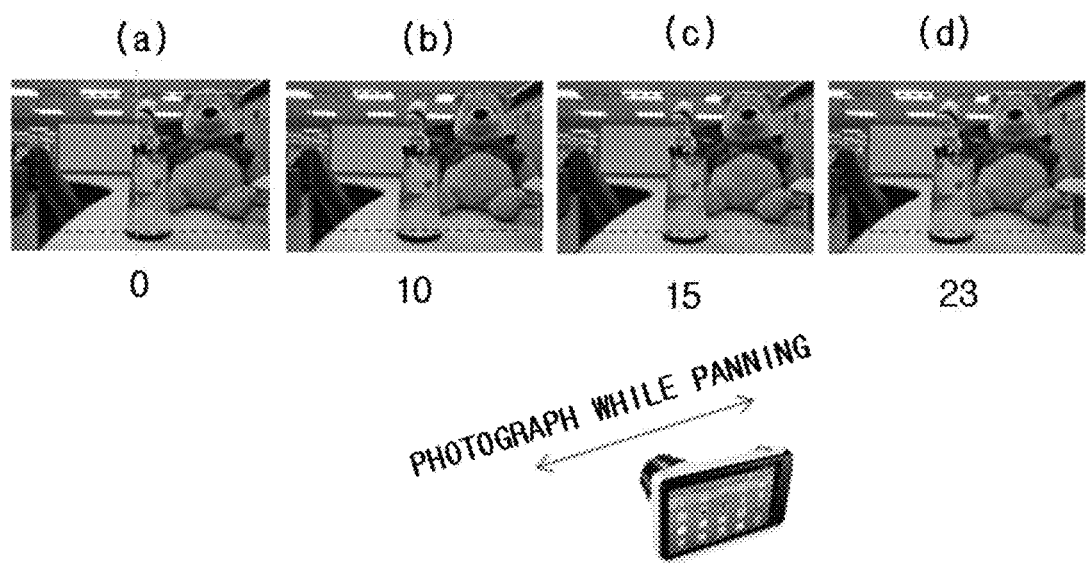
FIG. 4 illustrates a method for correcting the disparity of images.

FIG. 2 is a block diagram of a 3-dimensional (3D) image providing system according to an embodiment, FIG. 3 is a block diagram of a controller of FIG. 2 according to an embodiment, and FIG. 4 illustrates a method for correcting the disparity of images.

Referring to FIG. 2, a 3D image providing system 100 may include an image capturing apparatus 110, an accelerometer 120, a controller 130, and a storage unit 140.

The image capturing apparatus 110 may acquire an image of a subject.

The sampling rate of the accelerometer 120 should be higher than speed at which images are captured.

The accelerometer 120 is a sensor that detects a change in velocity—i.e., acceleration. The accelerometer 120 may sense movement of the camera apparatus 1, measure its acceleration, and output a corresponding acceleration value. The accelerometer 120 may be an electronic accelerometer or a piezoelectric accelerometer. An electronic accelerometer measures the acceleration of a moving device having a certain mass by using an electromotive force between a magnet and a coil. A piezoelectric accelerometer measures acceleration based on applied pressure using a piezoelectric device that generates a voltage when pressure is applied thereto. However, the accelerometer 120 is not limited to an electronic accelerometer or a piezoelectric accelerometer, and may be any other sensor capable of measuring acceleration.

The controller 130 synchronizes a plurality of images acquired by the image capturing apparatus 110 with the acquisition locations (calculated based on acceleration) of the plurality of images, identifies one or more 3D image regions of the individual images based on an image acquisition reference region, adjusts the locations of the one or more 3D image regions, and crops the resultant 3D image regions, thereby generating 3D images.

Referring to FIG. 3, the controller 130 may include a mode setting unit 131, a relative coordinate calculator 132, a synchronization processor 133, an image acquisition location setting unit 134, an image cropping unit 135, a 3D image generator 136, and a 3D panorama image generator 137.

More specifically, the mode setting unit 131 may set a 3D image generation mode or a 3D panorama image generation mode according to a selection from a user. The user may press a driving button installed in the camera apparatus 1 or touch a menu displayed on a display (not shown) of the camera apparatus 1 to cause the mode setting unit to select the 3D image generation mode or the 3D panorama image generation mode.

The relative coordinate calculator 132 may calculate the location of an image at the time when the image was acquired, based on acceleration information provided by the accelerometer 120. In more detail, the relative coordinate calculator 132 may calculate the location of the image at a time when the image was acquired, using Equation (1) below.

$$x(t_1) = \int_{t_0}^{t_1} \int_{t_0}^{t_0} \ddot{x}(t) dt - x(t_0) \tag{1}$$

where $x(t_1)$ represents the location of the image at the time when the image was acquired, $t_0$ represents the time at which calculation started, $t_1$ represents a time at which photographing started, and $\ddot{x}(t)$ represents an acceleration value.

The synchronization processor 133 may match the image with its acquisition location. The image and the location may include identification information so that they can be referred to upon matching.

The image acquisition location setting unit 134 may set an image acquisition reference region from the first image of a plurality of images (e.g., a series of images) transferred from the image capturing apparatus 110. The image acquisition reference region defines a region to be cropped in the image. The image acquisition reference region set from the first image corresponds to a 3D image region, and may be referred to later upon cropping.

For example, when the 3D image generation mode is set, and a plurality of images are acquired by the image capturing apparatus 110, the image acquisition location setting unit 134 sets an image acquisition reference region from the first image of the plurality, and applies the image acquisition reference region to the following image so that one or more 3D image regions can be cropped based on the image acquisition reference region.

Also, the image acquisition location setting unit 134 may adjust the locations of the 3D image regions of the respective images based on the image acquisition reference region and a reference disparity. The image acquisition location setting unit 134 may set a disparity between the first image and the second image to the reference disparity, or may set the reference disparity to be an arbitrary value input by the user.

The positions of the same object point formed on the left and right retinas of both eyes may be different from one another. A difference between the position of an object image formed on one retina and the position of the corresponding object image formed on the other retina is defined as a disparity. For example, if an image is formed 4 mm to the left of the fovea of left eye, and the corresponding image is formed 3 mm to the left of the fovea of right eye, the disparity is 1 mm.

Also, the image acquisition location setting unit 134 may move a 3D image region of the image adjustment such that a disparity between the image and the previous image becomes the reference disparity. A little disparity is needed to give a 3D effect. However, if there is a too great of a disparity, a viewer may perceive a single object as two objects. All objects have some disparity unless they are located on a horopter.

Referring to an example illustrated in FIG. 4, the relative coordinates representing locations of a plurality of images (a) through (d) at times when the respective images (a) through (d) were acquired are 0, 10, 15, and 23, respectively. The reference disparity has been set to 10. The image acquisition location setting unit 134 corrects the relative coordinates 15 and 23 of the image (c) and (d) such that disparities of images (c) and (d) become 10. However, the image acquisition location setting unit 134 does not correct images (a) and (b) since disparities of images (a) and (b) are already 10.

Also, the image acquisition location setting unit 134 may adjust the vertical alignment of the respective images based on the image acquisition reference region. For example, the image acquisition location setting unit 134 may adjust the vertical alignment based on the image acquisition reference region set from the first image. More specifically, the image acquisition location setting unit 134 may adjust the vertical alignment of an image by applying an image pattern matching technique, which is a general image processing technique, to the image, or may calculate vertical coordinate values of the image using Equation (2) below.

$$y(t_1) = \int_{t_0}^{t_1} \int_{t_0}^{t_0} \ddot{y}(t) dt - y(t_0), \qquad (2)$$

where $y(t_1)$ represents the location of the image at the time when the image is acquired, $t_0$ represents the time at which the calculation started, $t_1$ represents the time at which photographing has started, and $\ddot{y}(t)$ represents an acceleration value The image cropping unit 135 may crop the one or more 3D image regions of the plurality images. The term "crop" means trimming a picture to a desired size when editing the picture. The pattern of lines indicating where to trim (crop) an image to a smaller size is referred to as a crop mark, and the part cut out from an image is referred to as a cropped part. In the example of FIG. 4, dotted lines drawn on images (a) through (d) are crop marks.

The 3D image generator 136 may generate 3D images based on the 3D image regions. The image cropping unit 135 may then crop the 3D image. More specifically, the 3D image generator 136 creates images of 3D image regions acquired sequentially through burst shoot, subject to panning speed compensation, as left and right images, and synthesizes the left and right images, thereby generating 3D images.

The 3D panorama image generator 137 may generate a 3D panorama image based on the 3D image regions acquired by the image capturing apparatus 110 through panning. The image cropping unit 135 may then crop the 3D panorama image. The 3D panorama image generator 137 is used to generate a 3D panorama image based on the 3D images generated by the 3D image generator 136.

The storage unit 140 may store all information related to the 3D image providing system 100, as well as the image acquisition reference region, the reference disparity, and the 3D image regions.

Figure 5:
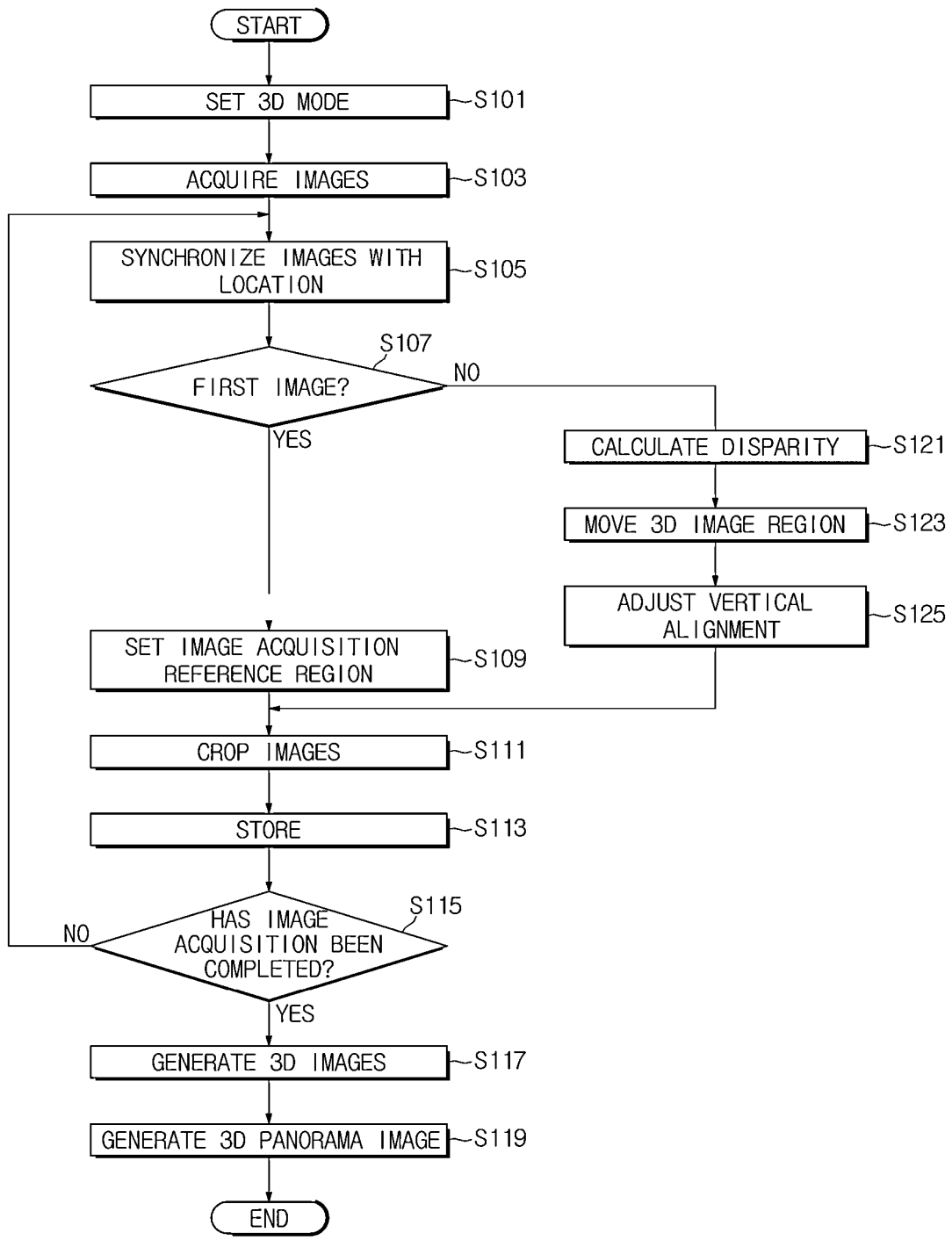
FIG. 5 is a flowchart of a 3D image providing method according to an embodiment.

FIG. 5 is a flowchart of a 3D image providing method according to an embodiment, wherein the 3D image providing method is performed by the 3D image providing system 100 illustrated in FIG. 2.

Referring to FIGS. 2 and 5, if the 3D image providing system 100 enters the 3D image generation mode, the 3D image providing system 100 may acquire images of a subject through the image capturing apparatus 110 (S101 and S103).

The 3D image providing system 100 may measure acceleration through the accelerometer 120. The sampling speed of the accelerometer 120 should be higher than the speed at which images are acquired. The accelerometer 120 may sense movement of the corresponding camera apparatus 1 (see FIG. 1), and output an acceleration value. The accelerometer 120 is a sensor for detecting a change in velocity. The accelerometer 120 may be an electronic accelerometer or a piezoelectric accelerometer. The electronic accelerometer measures a movement distance of a moving device with certain mass using an electromotive force between a magnet and a coil, and the piezoelectric accelerometer recognizes acceleration based on applied pressure using a piezoelectric device that generates a voltage when pressure is applied thereto. However, the accelerometer 120 is not limited to an electronic accelerometer and a piezoelectric accelerometer, and may be any other sensor capable of measuring acceleration.

Then, the 3D image providing system 100 may synchronize the images acquired by the image capturing apparatus 110 with their acquisition locations, which are calculated based on the acceleration (e.g., of the image capturing apparatus 110) at a time when each of the images is acquired (S105).

The image data and the location information at the time when the image data has been acquired may include identification information so that they can be referred upon matching.

Then, if the image is the first image of the plurality of images that were acquired, the 3D image providing system 100 may set an image acquisition reference region of the image (S107 and S109) based on the first image.

The image acquisition reference region is a reference region defining a region to be cropped in image data. The image acquisition reference region set from the first image data corresponds to a 3D image region, and may be referred upon later cropping. For example, when the 3D image generation mode is set, and a plurality of pieces of image data are acquired by the image capturing apparatus 110, the 3D image providing system 100 sets an image acquisition reference region from the first image data, and applies the image acquisition reference region to the following image data so that 3D image regions can be cropped based on the image acquisition reference region.

Meanwhile, if the image is not the first image, the 3D image providing system 100 may calculate a disparity between the image and the previous image (S121).

The positions of the same object point formed on the left and right retinas of both eyes may be different from each other. A difference between the position of an object image formed on one retina and the position of the corresponding object image formed on the other retina is defined as a disparity. For example, if an image is formed 4 mm to the left from fovea of left eye, and the corresponding image is formed 3 mm to the left from fovea of right eye, a disparity is 1 mm. A little disparity is needed to give a cubic effect, however, if there is a too great disparity, a viewer may perceive a single object as two objects. All objects so long as they are not placed on a horopter have some disparities.

Then, the 3D image providing system 100 may move a 3D image region of the acquired image such that a disparity between the image and the previous image becomes the reference disparity (S123).

Referring to the example illustrated in FIG. 4, when relative coordinates representing location information of a plurality pieces of image data (a) through (d) at times when the respective pieces of image data (a) through (d) have been acquired are 0, 10, 15, and 23, respectively, and a reference disparity has been set to 10, the 3D image providing system 100 corrects the relative coordinates 15 and 23 of the image data (c) and (d) such that disparities of the image data (c) and (d) become 10. At this time, the image acquisition location setting unit 134 does not correct the image data (a) and (b) since disparities of the image data (a) and (b) are 10.

Then, the 3D image providing system 100 may adjust the vertical alignment of the image based on the image acquisition reference region (S125). For example, the 3D image providing system 100 may adjust the vertical alignment of the image based on the image acquisition reference region set from the first image.

More specifically, the 3D image providing system 100 may adjust the vertical align of an image by applying an image pattern matching technique which is a general image processing technique to the image, or may calculate vertical coordinate values of an image using Equation (2).

Then, the 3D image providing system 100 may crop 3D image regions of the individual images, and store the results of the cropping (S111 and S113).

The term "crop" means trimming a picture to a desired size when editing the picture". A pattern of lines indicating where to trim (crop) an image to a smaller size is referred to as a crop mark, and a part cut out from an image is referred to as a copped part. In the example of FIG. 4, dotted lines drawn on the image data (a) through (d) are crop marks.

Thereafter, if image acquisition has been completed, the 3D image providing system 100 may generate 3D images based on the 3D image regions subjected to cropping in step S113 (S115 and S117).

If it is determined in step S115 that image acquisition has not yet been completed, the process returns to step S105, so that the 3D image providing system 100 repeatedly performs the above process starting from step S105.

Then, the 3D image providing system 100 may connect the 3D images to generate a 3D panorama image (S119).

Before step S121, the 3D image providing system 100 may set a disparity between the first image and the second image as the reference disparity. Alternatively, the 3D image providing system 100 may set the reference disparity to an arbitrary value input by a user.

Figure 6:
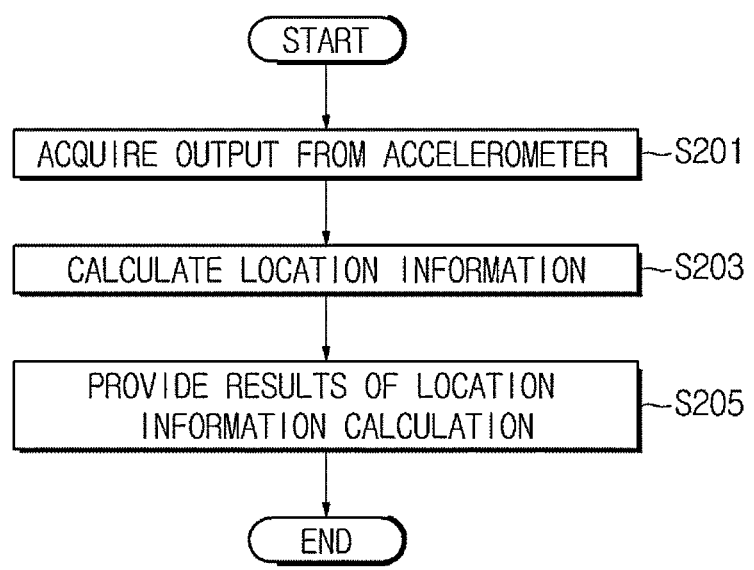
FIG. 6 is a flowchart of a method of generating information regarding the location of an image at the time when the image is acquired.

FIG. 6 is a flowchart of a method of generating the location of an image at the time when the image was acquired.

First, the 3D image providing system 100 may acquire acceleration data output from the accelerometer 120 (S201).

Then, the 3D image providing system 100 may calculate the location of the image at the time when the image was acquired, based on the acceleration data (S203).

In more detail, the 3D image providing system 100 may calculate location information of image data at a time when image data has been acquired according to Equation (1).

Next, at S205, the 3D image providing system 100 may use the location of the image in step S105 of FIG. 5.

Generally, 3D sweep panorama technology creates left and right images sequentially through burst shot while panning a camera to thus make intervals between the left and right images, and connects the left and right images to generate a 3D panorama. In 3D sweep panorama technology in general, since left and right images are acquired at intervals by panning a single lens, a binocular effect can be obtained. However, when the intervals between the left and right images become irregular due to a change in panning speed, the left and right images, which should have only positional differences, may appear unnatural on a screen, and image distortion may occur when the left and right images are reconfigured as a panorama. However, according to the embodiments as described above, by adjusting the interval between left and right images to a constant interval, it is possible to acquire a 3D panorama image with an appropriate sense of depth.

Also, according to the embodiments described above, by maintaining an appropriate amount of disparity, it is possible to provide natural 3D images, and by cropping images based on information acquired by an accelerometer, instead of image processing, it is possible to effectively reduce an amount of calculation needed for creating 3D images.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments. In the description of the embodiments, certain detailed explanations of related art are omitted when it is deemed that they may unnecessarily obscure the essence of the disclosure.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the disclosure pertains may easily implement functional programs, codes, and code segments for making and using the embodiments.

The embodiments may be described in terms of functional block components and various processing steps. Such functional blocks may be realized by any number of hardware and/or software components configured to perform the specified functions. For example, the embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, the embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description but by the following claims, and all differences within the scope will be construed as being included in the disclosure.

No item or component is essential to the practice of the embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Operations of methods described herein may be performed in any appropriate order. The scope of this disclosure is not limited by the following claims, the examples, or the exemplary terms. It will be understood by those of ordinary skill in the art that various modifications, combinations, and changes in form and details may be made according to design conditions and factors therein without departing from the spirit and scope as defined by the following claims or equivalents thereof.

What is claimed is:

1. A 3-Dimensional (3D) image providing system comprising: an image capturing apparatus that acquires a plurality of images of a subject, each image being captured at a respective location; an accelerometer that measures an acceleration; and a controller comprising a relative coordinate calculator that calculates, based on the measure acceleration, the location of each of the plurality of images at the time when the image was acquired, and that synchronizes the plurality of images with acquisition locations of the plurality of images, the capture location of each image of the plurality being calculated based on the measured acceleration, selects one or more 3D image regions of each of the plurality of images based on an image acquisition reference region of the image, adjusts the locations of one or more of the selected 3D image regions, and crops the selected 3D image regions, thereby generating 3D images, wherein the relative coordinate calculator calculates the location of each image at the time when the image was acquired according to:

$$x(t_1) = \int_{t_0}^{t_1} \int_{t_0}^{t_0} \ddot{x}(t) dt - x(t_0),$$

wherein $x(t_1)$ represents the location of the image at the time when the image was acquired, $t_0$ represents the time at which calculation started, $t_1$ represents the time at which photographing started and $\ddot{x}(t)$ represents an acceleration value.

2. The 3D image providing system according to claim 1, wherein the controller further comprises: a synchronization processor that matches each of the plurality of images with its calculated location; an image acquisition location setting unit that adjusts the locations of a 3D images region of the one or more 3D image regions of each of the plurality of images based on a reference disparity and on an image acquisition reference region; an image cropping unit that crops the one or more 3D image regions of each of the plurality of images; and a 3D image generator that generates the 3D images based on the cropped 3D image regions.

3. The 3D image providing system according to claim 2, wherein the image acquisition location setting unit sets the reference disparity to the disparity between a first image of the plurality of images and a second image of the plurality of images, or sets the reference disparity to an arbitrary value input by a user.

4. The 3D image providing system according to claim 2, wherein the image acquisition location setting unit moves a 3D image region of an image such that a disparity between the image and a previous image becomes the reference disparity.

5. The 3D image providing system according to claim 2, wherein the image acquisition location setting unit sets the image acquisition reference region based on a first image of a series of images transferred from the image capturing apparatus.

6. The 3D image providing system according to claim 2, wherein the image acquisition location setting unit adjusts the vertical alignment of each of the plurality of images based on the image acquisition reference region.

7. The 3D image providing system according to claim 2, further comprising a 3D panorama image generator that generates a 3D panorama image based on the cropped 3D image regions the plurality of images.

8. The 3D image providing system according to claim 2, further comprising a mode setting unit that sets a 3D image generation mode or a 3D panorama image generation mode according to a selection from a user.

9. A 3-Dimensional (3D) image providing method comprising: when a 3D image generation mode is set, acquiring an image of a plurality of images of a subject through an image capturing apparatus; measuring acceleration through an accelerometer; calculating, based on the measured acceleration, the location of each of the plurality of images at the time when that image was acquired; matching each of the plurality of images with its calculated location; if the acquired image is a first image of the plurality, setting an image acquisition reference region based on the first image; if the acquired image is not a first image, identifying 3D image regions of the acquired image based on the image acquisition reference region, and adjusting the locations of the 3D image regions; cropping the 3D image regions from the image; and generating 3D images based on the cropped 3D image regions, wherein the location of each of the plurality of images is calculated according to:

$$x(t_1) = \int_{t_0}^{t_1} \int_{t_0}^{t_0} \ddot{x}(t) dt - x(t_0),$$

wherein $x(t_1)$ represents the location of the image at the time when the image was acquired, $t_0$ represents the time at which calculation started, $t_1$ represents a time at which photographing started and $\ddot{x}(t)$ represents an acceleration value.

10. The 3D image providing method according to claim 9, wherein identifying the 3D image regions comprises:
    if the acquired image is not first image, calculating a disparity between the image and the previous image; and
    moving a 3D image region of the image such that the disparity between the image and the previous image becomes the reference disparity.

11. The 3D image providing method according to claim 10, further comprising:
    before calculating the disparity between the image the previous image, setting a reference disparity to the disparity between a first image of the plurality and a second image of the plurality, or setting the reference disparity to an arbitrary value input by a user.

12. The 3D image providing method according to claim 10, further comprising:
    after moving the 3D image region of the acquired image, adjusting a vertical alignment of each of the plurality of images based on the image acquisition reference region.

13. The 3D image providing method according to claim 9, further comprising after generating the 3D images, connecting the 3D images to generate a 3D panorama image.

* * * * *